May 14, 1968     M. FRIED ETAL     3,383,156
AUTOMATIC FILM CARTRIDGE SELECTING AND DISPLAY UNIT
Filed March 19, 1965     6 Sheets-Sheet 1
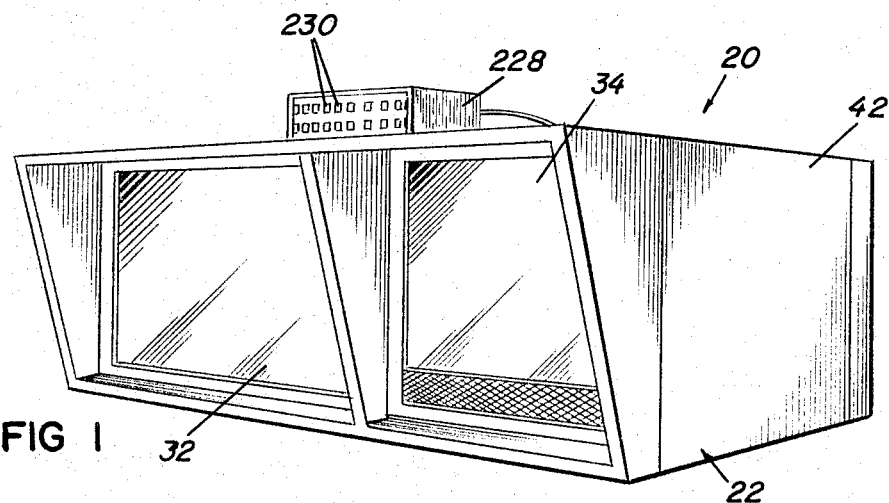
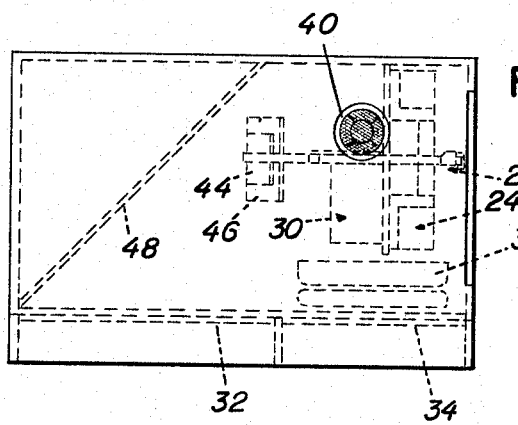
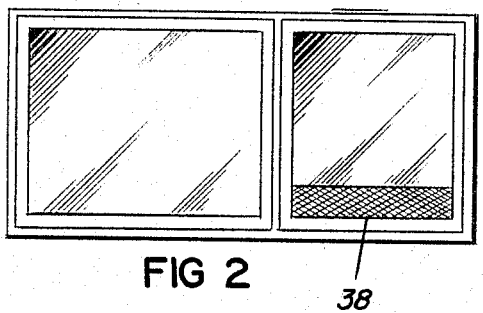
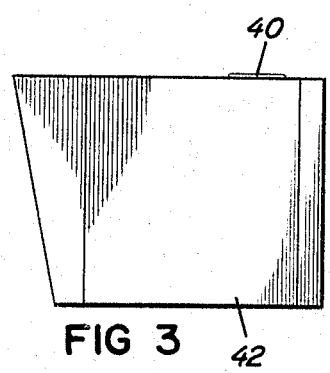
Mitchel Fried
Horace W. Nickerson
INVENTORS
BY Jacobi and Davidson
ATTORNEYS May 14, 1968 M. FRIED ET AL 3,383,156
AUTOMATIC FILM CARTRIDGE SELECTING AND DISPLAY UNIT
Filed March 19, 1965 6 Sheets-Sheet 2

Mitchell Fried
Horace W. Nickerson
INVENTORS

BY *Jacobs and Davidson*

ATTORNEYS

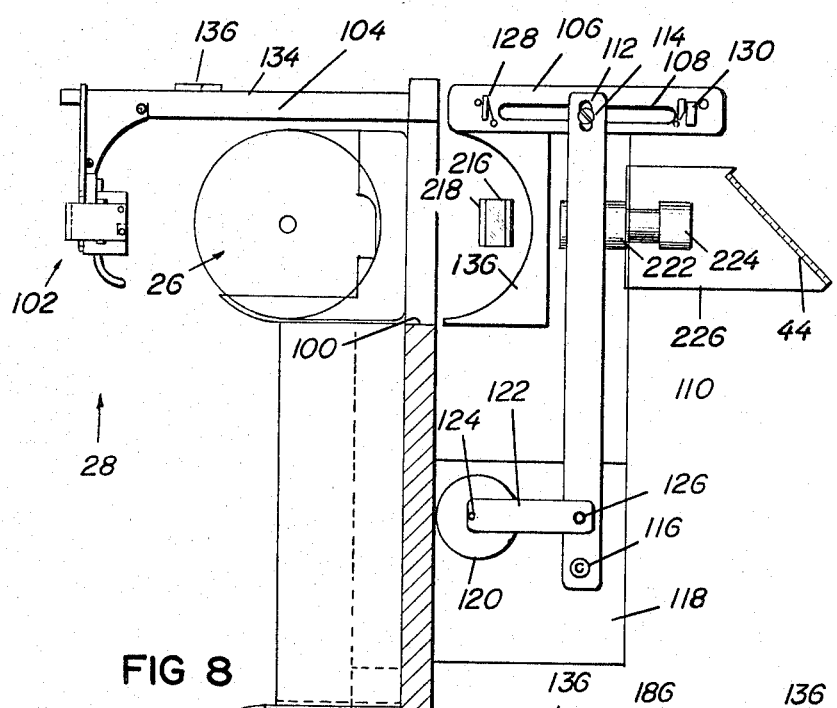
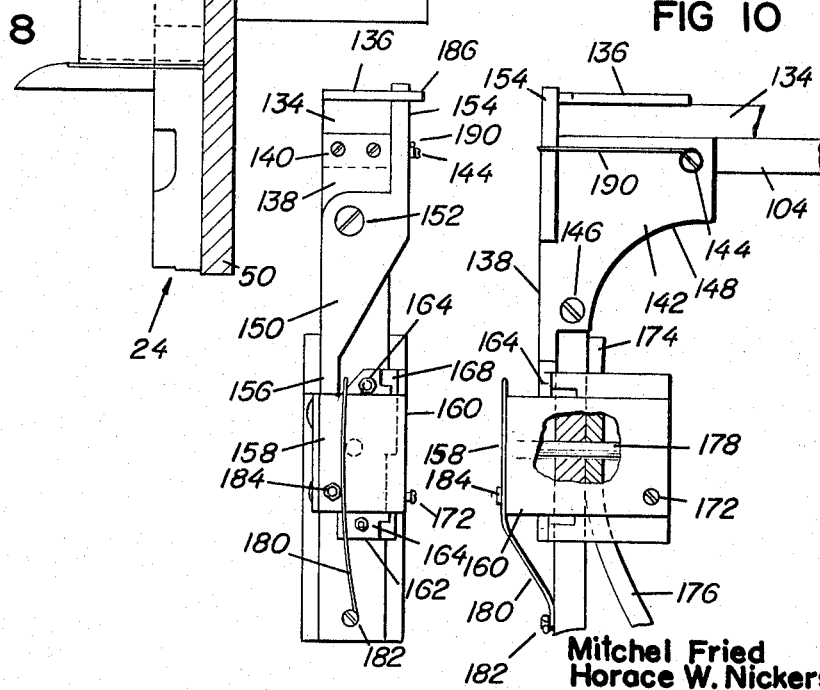

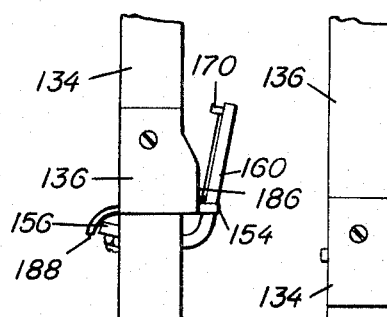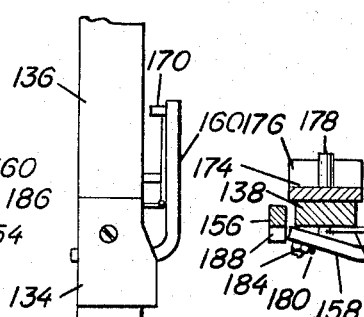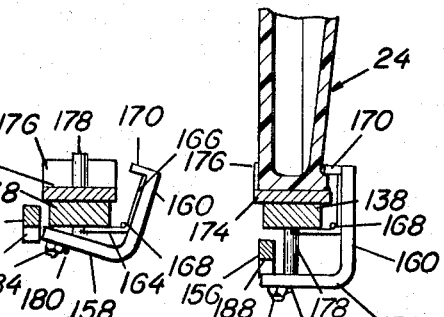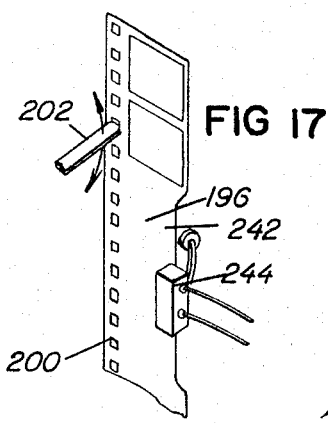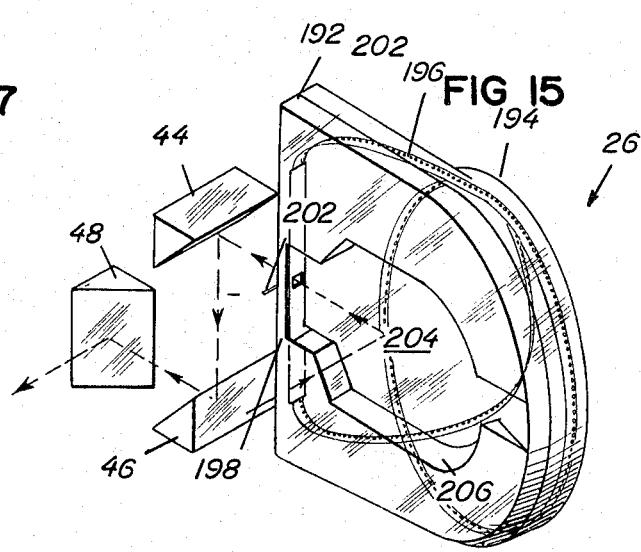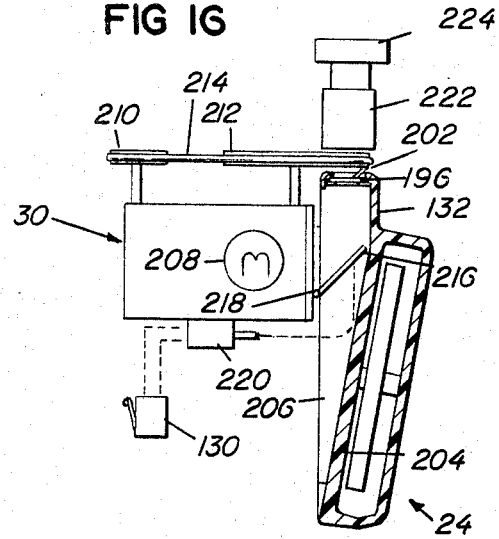
Mitchel Fried
Horace W. Nickerson
INVENTORS

United States Patent Office 3,383,156
Patented May 14, 1968

3,383,156
AUTOMATIC FILM CARTRIDGE SELECTING
AND DISPLAY UNIT
Mitchel Fried, 1142 NE. 176 Terrace, North Miami
Beach, Fla. 33162, and Horace W. Nickerson,
Miami Springs, Fla.; said Nickerson assignor to said
Fried
Filed Mar. 19, 1965, Ser. No. 441,264
4 Claims. (Cl. 352—123)

ABSTRACT OF THE DISCLOSURE

A film selecting and display unit used in combination with a juke-box to display a film in synchronism with a record played by the juke-box. The unit includes a plurality of individual film cartridges corresponding to the individual records on the juke-box and means are provided to positively move a particular film cartridge, corresponding to a selected record, into operative engagement with a projector which displays the film while the record plays. When the record ceases playing, the film cartridge is positively disengaged from the projection apparatus.

---

This invention relates to a film display unit and more particularly, it relates to such a display unit wherein individual cartridges having pre-selected endless lengths of film therein are automatically and selectively transferred from a storage magazine into a film displaying device, are displayed, and are thereafter returned to the storage magazine.

The present invention is particularly adapted for, but not necessarily limited to, use in commercial automatic phonographs or juke-boxes. As is well known, the conventional juke-box unit has a plurality of separate recordings therein, and when such a juke-box is activated by insertion of a coin of the proper denomination, and a record selector mechanism is actuated, the selected record is automatically removed from its storage area, is played through the juke-box speaker system, and is thereafter returned to its storage position.

While such juke-boxes have received wide-spread commercial acceptance, the entertainment value is necessarily limited to a single human sense, namely, sound. It is felt that the entertainment value of such units could be greatly enhanced by providing a motion picture projection device, compatible with the juke-box, to display a film simultaneously while a record is being played. In such a combination type unit, the appeal and entertainment value would be directed toward two human senses, namely, sight and sound.

Naturally, for a unit of the type described hereinabove to be commercially acceptable, it is necessary that a series of separate films be provided for conjunction with the series of separate records normally maintained in the conventional juke-box. The selection of the particular film to be played could be correlated to the selection of the particular recording within the juke-box, so that for any individual record, a compatible film is selected for display. Alternatively, and preferably, the film in the unit would be provided with a separate selector means, thus enabling any film to be selected for any record. When such a film is selected, it must be sent to a projecting device which can display the image on a viewing screen, and after the particular record has been played, the film must be returned to its storage position.

Recognizing the broad or general nature of the present invention from the matter set forth hereinabove, certain particular requirements for a unit such as that suggested herein become apparent. For instance, it must be recognized that there are thousands of conventional juke-boxes in commercial use at the present time. For a display unit of the type set forth in the present invention to be accepted in the trade, it is necessary that such a unit be adaptable for use with a conventional juke-box, without necessarily requiring extensive rebuilding, rewiring or reconstruction of the juke-box. Also, the film and record preferably start and finish at substantially the same time. Moreover, the unit should be capable of operating with a substantial number of different films, preferably films of a cartridge type which are presently commercially available.

Additionally, the unit should be such that the film does not have to carry any sound track thereon, as is the case with the types of sound-film units presently in use.

In this latter regard, there have been available certain types of home entertainment units wherein sound motion pictures could be displayed. However, in units of this type, no provision was made for having a plurality of individual films which could be selectively shown, and instead, units of this type were directed essentially toward the showing of a full-length film, having a sound track to accompany the same. Also, even with home entertainment units of this type, it was necessary to employ a separate viewing screen.

With the foregoing in mind, it is, therefore, an object of the present invention to provide a film display device which can be utilized in conjunction with a conventional multi-selection phonograph or juke-box.

Another object of the present invention is to provide such a display unit having means therein for selecting a particular film from a plurality of films stored therein, for feeding such film to a display position, and for then returning such film to its stored position.

Another object of the present invention is to provide, in a unit having a plurality of individual film cartridges, a means for selectively engaging one of such cartridges, moving such cartridge to a display position, operating such cartridge to display the film therein, and thereafter returning such cartridge to its initial storage position.

Another object of the present invention is to provide feeding and engaging means for a unit of the type described herein, which feeding and engaging means is operable to remove a selected cartridge from its storage position, to transfer the cartridge from its storage position whereat the means locks onto the cartridge, and to thereafter return the cartridge to its storage position whereat the means automatically unlocks the cartridge.

Other objects of the present invention include the provision of a unit: (a) which operates in a fully automatic manner, after a selection is made, to move a cartridge magazine from an initial position until a selected cartridge is in discharge position, which then removes the selected cartridge and automatically operates the web therein, which then replaces the selected cartridge in the magazine and which then returns the magazine to its initial position; (b) which includes an engagement means which freely pushes the selected cartridge from its position in the magazine to a predetermined location, which automatically locks onto the cartridge at said predetermined location, which can thereafter pull the locked cartridge back from said predetermined location and which automatically unlocks and releases the cartridge once it has been returned to its magazine storage position; (c) which includes means operable responsively to depression of a particular selector button to select a particular cartridge corresponding to that button, and which moves the selected cartridge from its initial position to a position whereat the cartridge can be discharged; (d) which includes projector means for automatically operating an endless film within a selected cartridge to advance the film through one complete cycle; and project the image from a film strip onto a suitable display screen forming a part of the unit; (e) which has feeding means which automatically conditions a projector when the film cartridge is moved to a displaying position for subsequent actuation, and which automatically returns the cartridge to its storage position once the projection has completed a display of the film.

Further objects of the present invention include the provision of a display unit which: (a) can be utilized in conjunction with any conventional juke-box without extensive rewiring or reconditioning of such juke-box; (b) employs its own projecting mechanism and viewing screen, thereby providing a complete and compact individual unit; (c) operates in synchronism with the juke-box with which it is associated to thus assure that the film displayed and the record played are in correlation with one another; (d) is relatively inexpensive to produce, yet can be simply combined with a conventional juke-box to convert the same from a simple sound unit to a "sight and sound unit"; and (e) operates responsively to operation of the juke-box with which it is associated whereby, when a customer inserts a coin into the juke-box and makes a record and film selection, the selected record and film will automatically be moved from storage position to operating position, will respectively be played and displayed, and will thereafter be returned to storage position.

Other objects, advantages and salient features of the present invention will become apparent from the following detailed description, which, taken in connection with the annexed drawings, discloses a preferred embodiment thereof.

Broadly speaking, the foregoing objects are attained by providing a display unit having a viewing screen, a projector adapted to project an image through a mirror system onto the viewing screen, a film cartridge storage magazine capable of holding a plurality of individual film cartridges, and a feeding and engaging mechanism capable of removing a selected film cartridge from the magazine and coupling the same to the film projector which will display the film image on the viewing screen.

The display device or unit of the present invention is adapted to be coupled to a conventional juke-box, such as the type having a plurality of individual recordings therein. A set of film selector buttons and a set of record selector buttons are provided for selective operation by the customer. When a customer inserts a coin of the appropriate amount into the juke-box, and depresses a particular set of selector buttons, an individual record is selected for playing and an individual film is selected for displaying. The display device of the present invention is electrically coupled to the juke-box whereby insertion of a coin into the juke-box energizes both the juke-box and the display device. Thereafter, depressing of a film selector button causes the film cartridge magazine to be rotated to a particular position, whereat the selected film cartridge is in a discharge position.

At that time, rotation of the film magazine ceases and a feeding motor is set into operation. The feeding motor operates a linkage which brings an engagement means into contact with the selected cartridge to push the same forwardly, thereby discharging it from the magazine. When the cartridge reaches a predetermined stop position, it is prevented from further forward movement; however, the feeding means may continue to move until the engagement means locks against the cartridge, if it has not already so locked. Substantially simultaneously with such locking, the projector is turned on. When the tone arm of the juke-box contacts the surface of the selected record, the projector proceeds to advance the film within the cartridge, projecting the image from such film through a lens and a mirror series and finally onto the viewing screen.

When the entire strip of film within the cartridge has been completely displayed, the projector is turned off and the feeding means is again actuated to return the cartridge rearwardly to the magazine. Since the engagement means remains locked against the cartridge, rearward movement of this engagement means actually pulls the cartridge rearwardly into the magazine. Once the cartridge is properly positioned in the magazine, the engagement means automatically unlocks and releases from the cartridge. The feeding means continues to move the engagement means rearwardly until it clears the magazine and the cartridges therein, leaving them free to rotate. Then, the magazine is again rotated until it returns to its initial or home position.

The foregoing paragraphs briefly describe the operation of one cycle of the device of the present invention. When another coin is inserted into the juke-box, another film can be selected, and the magazine then rotates until that selected film cartridge is in discharge position and the foregoing cycle is repeated.

Referring to the drawings:

FIGURE 1 is a perspective view of an automatic film cartridge and display unit in accordance with the principles of the present invention;

FIGURE 2 is a front elevational view thereof;

FIGURE 3 is a side elevational view thereof;

FIGURE 4 is a top plan view thereof, showing the general arrangement of the components within the unit;

FIGURE 8 is a side elevational view, partially in section, of the unit of the present invention;

FIGURES 9–14 are fragmentary views showing the engagement means of the unit in various positions;

FIGURE 15 is a diagrammatic perspective view of a film cartridge and the mirror system utilized in the unit of the present invention;

FIGURE 16 is a top plan view, partially in section, of the cartridge of the unit coupled with the projector thereof;

FIGURE 17 is an enlarged fragmentary perspective view of the terminal end of the film strip which is disposed in the cartridge.

Figure 6:
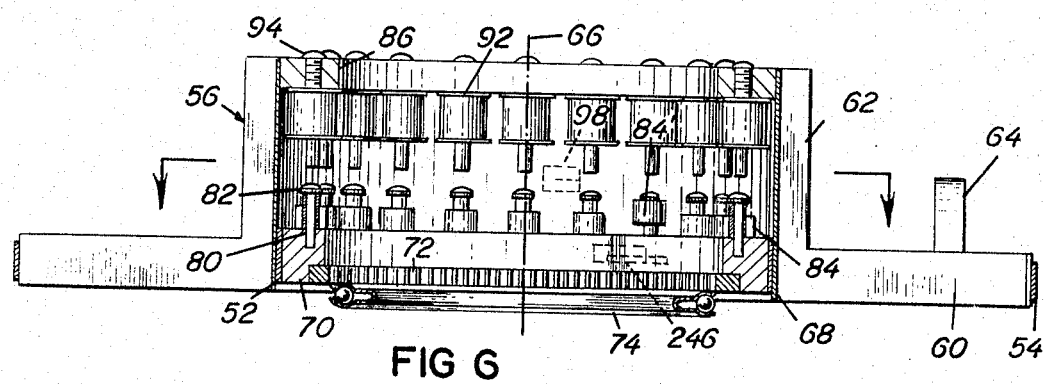
FIGURE 6 is a sectional view taken substantially along the line 6—6 of FIGURE 5.

In general, and in accordance with the principles of the present invention, there is provided a display unit or device generally designated 20 including a housing generally designated 22, a magazine generally designated 24 adapted to contain a plurality of endless supporting devices or cartridges, generally designated 26, an engaging and feeding mechanism generally designated 28 adapted to displace a particular cartridge from the magazine, and an endless web operating device generally designated 30, which, in the present invention preferably takes the form of a film projection apparatus.

As shown in FIGURES 1–4, the housing 22 includes a first glass screen 32 forming the displaying screen of the present invention and a second glass screen 34 disposed adjacent thereto, the screen 34 being utilized for purposes of advertisement and/or instructions for operation of the unit. Fluorescent light means 36 are disposed behind the screen 34 for illuminating the same and any indicia disposed thereon or therebehind, when the unit is energized. An air intake vent 38 is disposed beneath the screen 34 in the forward surface of the housing 22, and an exhaust vent 40 is located in the top of the housing, thereby assuring continuous air flow through the interior of the housing for cooling the electrical components therein. One side 42 of the housing may be formed as an access door which is hinged, or otherwise removable, to permit access to the equipment located within the housing.

The general overall arrangement of components within the housing can be thus appreciated by reference to FIG- URE 4, and also to FIGURE 8, and from these figures it will be seen generally that the magazine 24 is disposed adjacent to the projector or operating device 30, and that the engaging and feeding mechanism 28 is movable therebetween, to thus feed a cartridge 26 from the magazine to the projector in a manner which will be described in greater detail hereinafter. Once the cartridge is fed to the projector 30, and the endless film within the cartridge is advanced, also in a manner to be presently described, an image from the film is projected or displayed. A three-mirror system, as shown in FIGURES 4 and 15, is utilized to project the film image onto the display screen 32, with such a mirror system including a first mirror surface or prism 44 for directing the image downwardly, a second prism or mirror surface 46 for receiving the downwardly directed image and for then directing the same sidewardly, and a third prism or mirror surface 48 for receiving the sidewardly directed image and directing forwardly the same onto the display screen 32.

Figure 5:
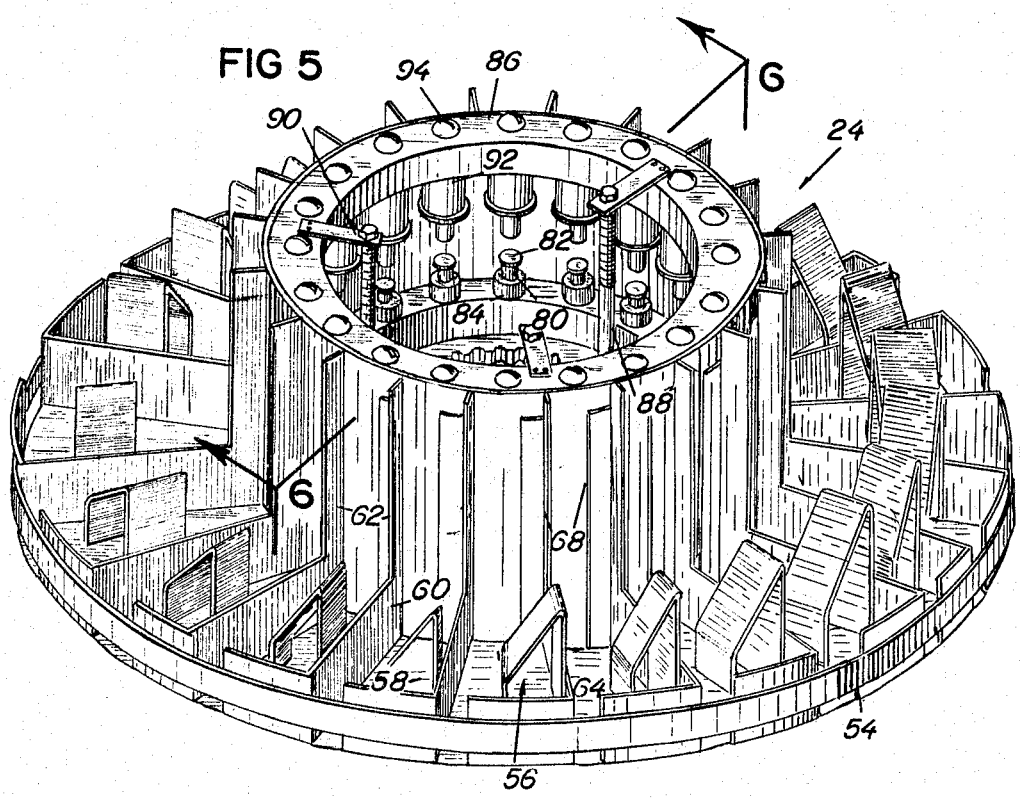
FIGURE 5 is a perspective view of the magazine assembly and selecting mechanism utilized in the unit of the present invention.
Figure 7:
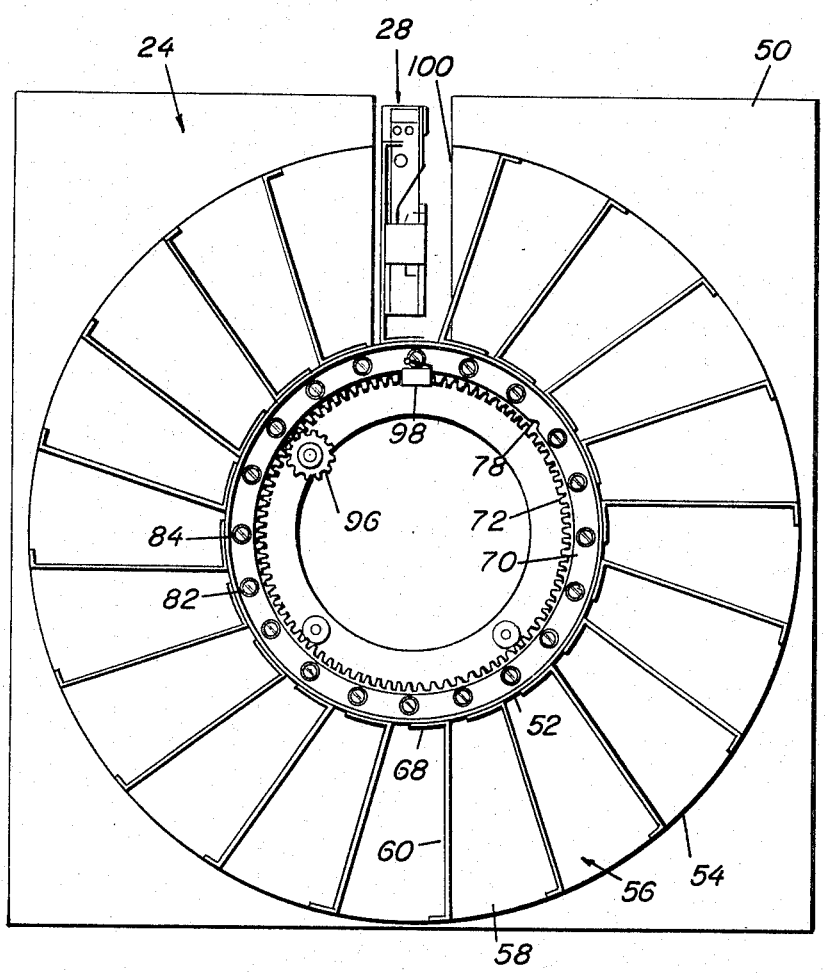
FIGURE 7 is a sectional view taken substantially along the line 7—7 of FIGURE 6.

The details of construction of the magazine 24 are shown in FIGURES 5-7, with this latter figure illustrating that the magazine 24 is mounted upon a flat base sheet 50, formed of plywood or other similar material. The magazine includes an inner circular ring member or band 52 and a larger outer circular ring member or stiffener 54 concentrically surrounding the inner ring member 52. A plurality of generally L-shaped dividers or cartridge holders, generally designated 56, extend between the ring members 52 and 54 to divide the magazine into a plurality of separate pockets identified as 58. Each divider 56 includes a substantially laterally projecting leg portion 60 extending between the ring members 52 and 54, and an upstanding portion 62 projecting upwardly along the outer periphery of the inner ring 52. A resilient spring finger 64 is attached to each of the portions 60 intermediate the ring members 52 and 54, with such spring fingers being adapted to frictionally hold a cartridge 26 between a pair of adjacent dividers 56, 56, or in another words, to retain a cartridge in a pocket 58. As shown in FIGURE 6, the magazine 24 has a central axis of rotation, designated 66, and when the magazine is rotated, the pockets 58 are revolved about this axis. However, since the magazine is mounted upon a base 50, as previously described, the bottom of the pockets 58 is closed and since each of the upstanding portions 62 includes a sidewardly directed portion 68, the cartridges 26 are necessarily limited during their insertion and/or removal from the pockets 58, to movement in a direction generally axially of rotational axis 66.

As can best be seen in FIGURE 6, a further ring member 70 is disposed within the inner ring member 52, and this further ring member 70 is undercut at its base to receive a ring gear 72, the ring member 70 and ring gear 72 being firmly secured to one another to assure concurrent movement thereof. A bearing plate 74 is disposed between the magazine 24 and its supporting base 50, to permit rotation of the magazine about its rotational axis 66. The ring member 70 is provided on its inner face with a groove or notch 78, defining a "home position" notch, whose use will be presently described.

A plurality of screw means are mounted in the ring member 70, with one such screw means being disposed in alignment with each pocket 58. The screw means is preferably fabricated of brass, and includes a screw having shank portion 70 whose lower end is mounted within the ring member 70 and whose upper end extends thereabove. At the top of the upper end of the screw shank 80, an enlarged head 82 is provided. A steel slug 84 is slidably mounted upon each of the screw shanks, and the height of the slug 84 is somewhat less than the distance between the face of the ring member 70 and the bottom of the enlarged screw heads 82. Thus, although each of the slugs normally rests against the surface of the ring member 70, any individual slug may be moved away from this surface and may be displaced into contact with the underside of the enlarged head 82. The slug 84' of FIG-URE 6 is shown in this displaced position, while all of the other slugs in that figure are shown in their normal or undisplaced position.

Electromagnetic coil means are provided for selectively displacing the slugs 84, and to this end, a stationary ring 86 is disposed in spaced superposition adjacent the ring member 70. The ring member 86 is mounted in its position by means of a plurality of spaced elongated guide screws 88 which extend outwardly from the base 50 and are disposed inside the ring gear 72. Each of these guide screws 88 attaches to a plate 90, affixed in some suitable manner to the ring member 86. Thus, the ring member 86 is held stationary in its position, although the ring gear 72, the interconnected ring member 70, the rings 52 and 54, and the interconnecting dividers 56 all freely rotate about the rotational axis 66. Conventional electromagnets or coils 92 are attached to one surface of the ring member 86 by screws 94, and one such coil is aligned directly with each of the enlarged screw heads 82. When a particular selected coil 92 is energized, in a manner to be presently described, it attracts the slug member 84 disposed beside it, and tends to displace that slug member until the same comes into contact with the enlarged screw head 82. Thus, in FIGURE 6, the coil 92' is the one that is energized, and because of this energization, the slug member 84' therebeneath has been raised.

As shown in FIGURE 7 a pinion 96 is disposed in meshing interengagement with the ring gear 72, and such pinion 96 is connected to a driving motor to be described hereinafter in connection with the wiring diagram of FIGURE 18. However, for purposes at this point, it is sufficient to state that operation of the driving motor imparts a rotation to the pinion 96, and this rotation is in turn imparted to the ring gear 70, thereby rotating the ring gear 70 and hence revolving the pockets 58 above the central rotational axis 66. Assuming that a cartridge 24 is disposed in each of the pockets 58, it will be understood that such cartridges are hence rotated until a selected one thereof is moved into alignment with the engaging and feeding mechanism 28. Without fully delving into the operational aspects of the present invention, it can be stated at this point that once the desired cartridge is selected, through selection means to be presently described, the coil 92' adjacent that cartridge is energized, thus raising the slug 84' also adjacent that pocket. As the magazine rotates, by action of the pinion 96, this raised or displaced slug 84 comes into engagement with a switch or control device 98, in general alignment with the engaging and feeding mechanism 28. When the slug so contacts this switch or control device, the magazine rotating motor is de-energized, rotation of the pinion 96 ceases, and the magazine is stopped, with the selected cartridge thus being in alignment with the feeding and engaging means 28. A slot or aperture 100 is provided in the base 50 to enable the engaging and feeding means 28 to move the selected cartridge axially out of its pocket 58 and toward the projector or operating device 30.

Referring now to FIGURE 8, the feeding portion of the feeding and engaging means 28 will be described. The engaging portion is generally designated 102 and is disposed at the extreme left hand end of a feed bar 104. The feed bar is mounted for linear movement through a guide member 106 having an internal track through which the feed bar extends. An elongated slot 108 is formed in one side of the guide 106 for pivotally attaching an actuating arm 110 to the feed bar 104. At its upper end, the actuating arm 110 is provided with a slightly elongated slot 112 and a pivot member 114 extends through this slot and connects to the side of the feed bar 104. At its lower end, the actuating arm 110 is provided with a fixed pivot 116. This fixed pivot 116 extends to a fixed housing 118, mounted on the base 50 and adapted to contain a feeding motor 120. A crank arm 122 is eccentrically connected to the motor 120 by an off-set pivot 124. At its other end, the crank arm 122 is connected near the lower end of the actuating arm 110 by a pivot means 126. Thus, when the motor 120 is put into operation, the eccentrically mounted crank arm 122 imparts a motion to the actuating arm 110 causing it to pivot about the point 116 and to thus move the feed bar 104 linearly through a guide member 106. Switches 128 and 130 are mounted at respective ends of the elongated slot 108, and when the actuating arm 110 is moved its full limit in one direction, the edge thereof engages and actuates one of the switches, for a purpose to be presently described. The entire purpose of the feeding operation is to move a selected cartridge 26 from the magazine 24, through the feed aperture 100 in the base member 50, and finally into a cartridge stop or socket 132. Turning now to the engaging means 102, it will be noted, as aforesaid, that such engaging means is mounted at the outboard end of the feed arm 104. A fixed top or limit bar 134 extends from the guide member 106 and is disposed above the linearly movable feed bar 104. A position stop 136 is attached to the upper face of the limit bar 134. The engaging means includes a rear plate 138 attached by screws 140 to the end of the feed bar 104, and thus depending downwardly therefrom. A side plate 142 extends between the feed bar and the rear plate 138, and is attached to these respective members by screws 144, 146. The forward edge of this side plate is formed with an arcuate portion 148, for engagement with a portion of the cartridge 26, as will be presently described.

By referring to FIGURES 9–14 the particular construction of the engagement means, as well as its manner of operation, will become apparent. A locking trigger 150 is attached to the rear plate 138 by a pivot 152, and this locking trigger includes an upwardly extending arm 154 and a downwardly projecting arm 156. Beneath the trigger pivot 152, a bracket is hingeably mounted. The bracket is generally L-shaped and includes a rear face 158 and a side face 160 disposed beneath the side plate 142. This L-shaped bracket is swingably attached to the rear plate 138 by a hinge having a rear face 162 attached by bolts 164 to the rear plate 138, and having a side face 166 affixed to the inner face of the bracket side wall 160. The pivot point of the hinge is designated 168, and as can best be seen from FIGURES 13 and 14, this pivot point is spaced forwardly somewhat from the rear wall 158 of the L-shaped bracket. A projection 170 extends inwardly past the side face 166 of the hinge, and although the projection 170 can merely be a pin, as shown in FIGURES 11–14, it can also be the shank of an adjustable screw having a head 172, as shown in FIGURES 9 and 10. One of the principal advantages for forming the projection as a screw is that by mere adjustment of the same, the length of the projection 170 may be adjusted.

An inner abutment element 174 having a slightly curved lower end 176 is attached to the inside face of the rear wall 138, as can best be seen in FIGURE 10. It is this abutment element which engages the rear surface of the cartridge 26 during locked feeding thereof. Aligned apertures are provided in the element 174 and the rear plate 138, and disposed within these aligned apertures is a lock pin 178, which is free for slidable movement. To control position of the L-shaped bracket, a spring finger 180 is provided, anchored at its lower end by a screw 182 extending into the rear plate 138. A nut 184, or some other similar abutment surface, is provided on the rear face 158 of the L-shaped bracket, and the biasing effect of the spring finger 180 tends to pivot the bracket about its hinge point 168, urging it to the position shown in FIGURES 11 and 13. For an understanding of the manner of operation of the engagement means 102, let it be assumed that the feed arm 104 is in its left or rear position, as shown in FIGURE 8. In such position, the upper arm 154 of the trigger abuts against the side cam surface 186 on the position stop 136. Thus, the lower arm 156 of the trigger is swung outside of the rear face 158 on the L-shaped bracket, thereby enabling the spring finger 180 to bias the bracket to the position of FIGURES 11 and 13. When the bracket is biased to this position, the lock pin 178 is pushed forwardly and the projection 170 is swung to its outward position. It will be noted, particularly from FIGURE 11, that the lower end of the arm 156 has a rearwardly extending hook portion 188. When the actuating arm 110 is set into operation to move the feed bar 104 forwardly, or to the right in FIGURE 8, the engagement means is brought into contact with the rear surface of a film cartridge 26. The front end of the lock pin 78 contacts the back of the cartridge and slides the cartridge forwardly, through the feed aperture 100 in the base member 50, and finally into the cartridge stop or socket 132. Once the cartridge 26 is disposed within the cartridge stop, it is naturally prevented from any further forward movement. However, as the feed bar continues to advance, and the pin 178 is prevented from further advancement, the movement of the pin is effectively rearwardly, thereby causing the hinge and bracket to pivot about the pivot point 168. Such pivotal movement is against the action of the spring finger 180, and it gradually causes the bracket and hinge to assume the position shown in FIGURES 12 and 14, whereat the projection 170 has swung into engagement with a small enlarged flange or rim at the rear edge of the cartridge 24. Also, at this time, the trigger 150 is caused to pivot about its pivot point 152 under the influence of a spring finger 190 extending rearwardly from the screw 144 and engaging the side of the upwardly extending arm 154. This pivotal movement of the trigger causes the hooked lower end 188 to swing in front of the bracket rear wall 158, thereby firmly locking the cartridge with its rear face in abutment against the elements 174, 176 and its side face having the small flange retained by the projection 170. Thus, when the actuating arm 110 feeds the cartridge rearwardly and back out of its stop 132, the cartridge will remain locked in the engagement means 102 and will move rearwardly through the feed aperture 100 and back into its pocket 58. As the cartridge becomes suitably disposed within its pocket, the upper arm 154 on the trigger slides into engagement with the cam surface 186 on the position stop 136. This camming action causes the trigger to pivot, even against the action of the spring finger 190, and as such pivoting occurs, the hooked end 188 moves out from in front of the bracket, thereby enabling the bracket to pivot to the position shown in FIGURE 11, and thus unlocking the cartridge.

From the foregoing description, it will be apparent that, in a general fashion, the engagement means 102 merely pushes the cartridge 26 as the feeding means advances, and the cartridge is actually free from connection with the engagement means during this period. However, once the cartridge reaches its final destination in the cartridge stop 132, or before that if any resistance to movement is encountered, the engagement means locks onto the cartridge. Thus, when the feeding means operates to reverse or retract the cartridge, the cartridge is locked in the engagement means, and as the engagement means 102 is moved rearwardly, the cartridge locked therein is likewise moved rearwardly. Once the cartridge is finally back in its proper pocket, unlocking is automatically accomplished in the manner just described.

Referring now to FIGURES 15 and 16, there is illustrated the preferred form of cartridge for use in the present invention. The cartridge, as shown in FIGURE 15, includes a first portion 192 and a second generally circular portion 194, disposed along the side thereof. An endless film is placed, in coil form, within the portion 194. The film strip, designated 196, feeds from the outer periphery of the coil across the top of the portion 192, down the front thereof past a window 198, back across the bottom thereof and then feeds back to the interior of the coil in the portion 194. Thus, as the film is fed or advanced, in a manner to be presently described, the coil of film in the portion 194 feeds film off its outer periphery toward the viewing window 198, while at the same time receiving film from the window 198 which is wrapped about its inner periphery. The film strip 196 is provided with a series of feed apertures 200 along one edge thereof, and these apertures are engaged, in the vicinity of the window 198, by a film advancing claw 202 which functions to feed the film downwardly in the cartridge portion 192.

It will be noted from FIGURES 15 and 16 that the central portion of the cartridge portion 192 is cut away or interrupted from its outside to the common wall 204 which joins the portions 192 and 194. Thus, this cutting away or interrupting forms a recess or opening 206 in the cartridge, with such opening being aligned behind the window 198. In FIGURE 16, the cartridge is shown in its full forward position disposed in the cartridge stop or socket 132. In this position, the cartridge is disposed alongside the film projector and operating means 30. It is not considered important to discuss at any length herein, the actual details of the projector 30. Instead, it may be stated that the projector is essentially a conventional one, having an operating lamp 208, a motor operated drive wheel 210 and a driven wheel 212 connected to the drive 210 by a friction drive belt 214. The driven wheel 212 is coupled to the film advancing claw 202 whereby rotation of the wheel 212 imparts an oscillating motion to the claw 202 to advance the film in a downward direction. A small mirror 216 is connected to the forward end of the projector 30 by a hinge 218, and this mirror is adapted to be pivoted from its dashed line position of FIGURE 16 whereat it is adjacent the projector, to its solid line position of FIGURE 16 whereat it is swung outwardly into the film cartridge recess 206. Movement of the mirror 216 is controlled by a solenoid or other suitable control means 220, which is controlled by operation of the switch 130. As previously described, and as shown in FIGURE 8, the switch 130 is disposed at the forward end of the slot 108 and is adapted to be engaged by the actuating arm 110 when the cartridge is fed to its forward position within the cartridge stop 132. Thus, once the cartridge is in its full forward position, and the forward edge of the actuating arm 112 engages the switch 130, such engagement serves to energize the solenoid 220 to thereby pivot the mirror 216 outwardly and into the recess 206 within the film cartridge. When the mirror is in this position, it will be seen that the light from the projector lamp 208 shines onto the mirror 216 and is directed forwardly therefrom through the film strip 196 at the cartridge window 198. Thus, the image on the film is projected through the window 198, through a similar aligned window in the cartridge stop 132, through apertures in the driven wheel 212, through a lens coupling 222, and finally through an adjustable focusing lens 224. As shown in FIGURE 8, a mounting means 226 supports the mirror 44 in angularly disposed relation forwardly of the focusing lens 224. Thus, as shown in FIGURES 4 and 15, the image transmitted through the lens 224 is reflected from the mirror 44 to the mirror 46, then to the mirror 48 and finally onto the viewing or display screen 32 of the unit 20.

The cartridge 26 and the projector 30 described hereinabove cooperate in a highly efficient and desirable manner to produce the desired result herein, but the precise details of the cartridge and the projector do not actually form a part of the novel matter of the present invention. Actually a compatible cartridge and projector of the type described herein are commercially available from Technicolor Corporation of Hollywood, Calif. Moreover, it should be understood that while the present invention is particularly adapted for use as a film display device, the principles thereof can be used in other and similar environments. For instance, instead of a film cartridge and projector, it might be possible to use a reel of magnetic tape and a recording head or a punched tape having a binary code thereon, and a photosensitive pick-up therefor. Indeed, the principles of the present invention would appear to be applicable to almost any form of endless web, supported on some suitable device, and an operating means which produces some desired result responsively to feeding of the endless web.

As previously mentioned, a plurality of pockets 58 are provided in the magazine, and thus a plurality of separate film cartridges 26, each having a different film thereon, can be provided. In order to select a particular one of the films, a selector box 228 is provided, with such a box having a plurality of selector buttons, designated 230, one for each of the pockets 58 in the magazine. As shown in FIGURE 1, the selector box 228 is formed as a separate unit, electrically connected to the unit 20 previously described. The reason for providing such separate unit is so that the selector buttons 230 may be located at a position remote from the location of the display unit 20. For example, as described in introduction to the specification, the unit 20 is particularly designed for operation in conjunction with a conventional juke-box. Thus, as will be described in greater detail hereinafter, the unit 20 is electrically coupled to the juke-box and receives its power therefrom. However, the unit need not be, and preferably is not, provided at the same location as the juke-box. Instead, the unit 20 is preferably provided at some location remote from the juke-box, as for example, above a bar. However, the selector unit 228 and the buttons 230 may be provided at the same place as the juke-box, thus enabling a customer to drop a coin into the juke-box, to select a record in the juke-box and to select a film in the unit 20. On the other hand, the unit of the present invention is not necessarily capable of use only with a juke-box, phonograph, or other auxiliary similar component. Rather, if desired, the unit 20 can be utilized as a home entertainment unit merely by connecting the same to a suitable source of power, as, for example, a conventional wall outlet. Then, the button selector box could be moved away from the unit 20 so that selection, operation and display of the films can be remotely controlled.

Figure 18:
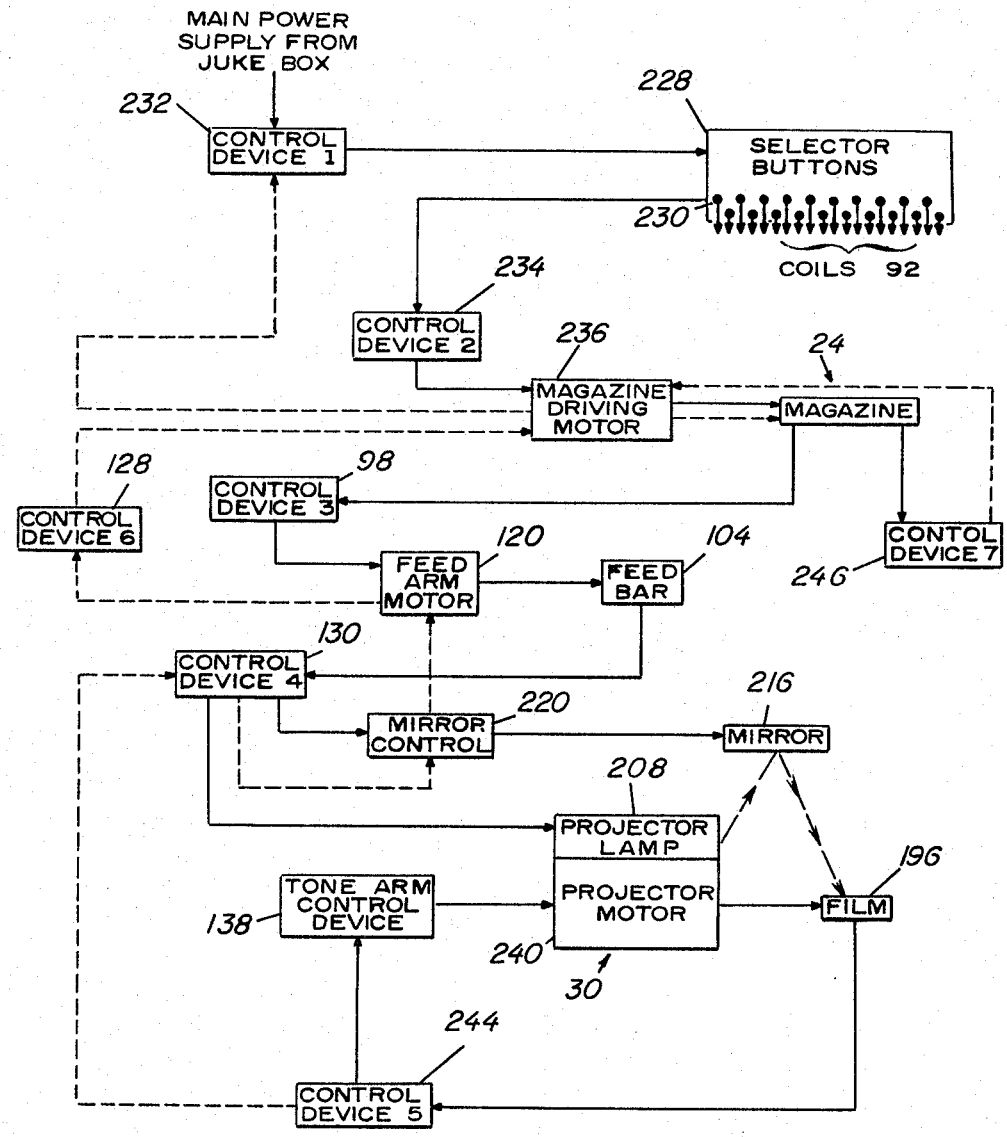
FIGURE 18 is a schematic diagram of the various components of the unit their manner of interconnection.

Referring now to FIGURE 18, operation of the unit of the present invention will be described, assuming that the unit of the present invention is used in conjunction with a juke-box. When a coin of the proper denomination is inserted in the juke-box, the juke-box is energized, and such energization places the juke-box in ready condition for the customer to select a particular record thereon. Such coin actuated juke-box energization simultaneously closes a controlled device 232, designated "control device 1" in FIGURE 18. Closing of the control device 1 places the selector unit 228 in energizable condition, so that the depression of one of the buttons 230 will actuate the coil or solenoid 92 associated with that button. Actually, the customer will first depress a button 230 to select a film, and thereafter will depress a button on the juke-box to select a record to be placed in conjunction therewith. When the button 230 is pushed inwardly or depressed, it cuts off all other operating power, and energizes only the coil 92 associated therewith. Such coil energization pulls out the slug 84 aligned with the coil, in a manner previously described. Then, when the selector button 230 is released, it places the circuit of the unit in operating condition through a control device 234, also designated "control device 2" in FIGURE 18. Such energization sets a magazine driving motor 236 into operation, thus causing the magazine 24 to rotate about its rotational axis 66. The magazine rotates until the slug which was pulled outwardly by the coil 92 comes into contact with a switch 98, previously described, and shown in FIGURE 18 also as "control device 3." When control device 3 is actuated, rotation of the magazine is terminated, with the selected cartridge 24 thus being in alignment with the feeding and engagement mechanism 28, and simultaneously, the feed arm motor 120 is energized. As previously described, operation of the motor 120 causes a linear movement of the feed bar 104, thus feeding the cartridge out of its pocket 58 in the magazine and into the cartridge stop 132. When the feed bar actuating bar 110 reaches the end of its forward travel, it engages and closes the switch 130, which is also designated "control device 4" in FIGURE 18. Closing of the control device 4 energizes the mirror control solenoid 220 to swing the mirror 216 outwardly to the solid line position of FIGURE 16. Similarly, the control device 4 energizes the lamp 208 in the projector 30 so that light rays from the lamp are reflected from the mirror 216 onto the film 196. Since it generally takes a somewhat longer time for the juke-box to select a record and place the same in playing position, than it does to place a selected film cartridge in displaying position, it is necessary to provide some means to assure that the film and the record will start playing essentially simultaneously. To this end, a tone arm control device 238 is provided, with such device preferably being a switch which is actuated when the tone arm of the juke-box comes in contact with the record. This tone arm control device operates a projector motor 240 to start advancing the film at the same time that the sound from the record begins. From this time on, the juke-box does not have any control over the display unit, and thus the selected record and the selected film each go through their cycle independently. Although the film 196 is endless, it nevertheless has an initial frame and a terminal frame, whereby one complete scene or series of scenes is displayed on the film. Thus, at the "end" or terminal portion of the film, a notch 242 is provided along the edge of the film, opposite to that edge carrying the feeding apertures 200. This is best illustrated in FIGURE 17 wherein it can be seen that a switch or other similar control device is cooperatively disposed along the edge of the film carrying the notch 242. This switch 244 normally rides along the edge of the film, but when the notch passes the switch, the switch is energized or actuated, by moving out of contact with the film. This switch 244 is also designated "control device 5" in the circuit diagram of FIGURE 18.

The foregoing descriptive matter has set forth the operation of the unit of the present invention from the time of selecting a film until the time that the time display is completed. There will now be described the manner of returning the cartridge to its proper position and for de-actuating the unit 20. To differentiate the foregoing operational cycle from that set forth hereinafter, it will be noted that in FIGURE 18 solid lines or arrows are used to designate the select and play cycle, while dashed lines are used to designate the return cycle. Actuation of the control device 5 initiates the return cycle, since this control device is energized when the film has completed its full playing length. Thus, even in the unlikely event that the tone arm control device 238 is still energized, the control device 5 nevertheless provides an over-ride therefor, serving to cut off or stop the projector motor 240. Simultaneously, a signal from the control device 5 is sent to the control device 4, thereby de-energizing the unit control circuit. When the control device 4 receives this signal, it cuts off the projector lamp 208, actuates the mirror control 220 to pivot the mirror 216 to its inward position, as shown in dashed lines in FIGURE 16, and sets the feed arm motor 120 into operation again. Operation of the feed arm motor causes the feed bar 104 to retract, and the engagement means 102 on the feed arm, which is locked onto the cartridge 26 in a manner previously described, draws a cartridge back into the magazine pocket 58 from which it was initially displaced. When the cartridge is again back in the proper magazine pocket, the engagement means 102 releases the same, in the manner described hereinabove. Once the feed bar reaches such a retracted position, where the cartridge is returned to its magazine pocket, the edge of the feed bar actuating arm 110 contacts a switch 128 at the opposite end of the slot 103. Actuation of "control device 6," as switch 128 is also designated in FIGURE 18, causes the magazine driving motor 236 to again be set in operation, thus causing the magazine 24 to again rotate. During such magazine rotation, a cam surface, not shown, but disposed behind the switch 98, engages the displaced slug 84 and pushes the same back to its initial or undisplaced position. The magazine 24 continues to rotate until the slot or groove 78 in the magazine ring member 70 comes in contact with a switch 246 disposed generally beneath the switch 98, as can be seen in FIGURE 6. The switch 246 is also designated "control device 7" in FIGURE 18, and once it is energized by contact of the groove 78, it de-energizes or turns off the magazine driving motor 26. At this time, the entire unit has completed its cycle. That is, the magazine 24 is back in its initial or "home" position, all of the slugs 84 are back in their initial position, all of the cartridges 26 are disposed in their proper pockets, the projector 30 is de-energized, and the feeding and engagement means 28 is back in its initial position. Actuation of the control device 7 also transmits a signal to the control device 1, to reset the same and to thereby ready the unit for a new cycle. When another coin is inserted in the juke-box, the system is again energized in the manner previously described, and the foregoing cycle is repeated. The various "control devices" shown in FIGURE 18 can be relays, micro-switches, or other similar electrical control components which can accomplish the stated electrical functions set forth hereinabove.

While the foregoing detailed description is only illustrative of a preferred embodiment of the present invention, it does nevertheless serve to point out several of the beneficial aspects thereof. For example, it can be seen that the unit 20 is compact and attractive, and moreover, that such a unit can be readily utilized in combination with a conventional juke-box without the necessity for modifying the juke-box in any way. Also, the unit of the present invention provides a simple and efficient means and manner for moving a film cartridge from its storage pocket to its playing position, which means remains in engagement with a cartridge while the film is being displayed, and which thereafter returns the film cartridge to its initial storage position. While this feeding and engaging means includes several separate elements, it will be seen that these elements co-function to accomplish the desired forward and rearward movement of the cartridge in a simplified manner. That is, in the present invention, it is unnecessary to transfer the film cartridge between several separate article handling means whereas in prior art units of this general nature, i.e., units where multiple cartridges were handled, one means was provided for lifting the cartridge from its magazine, another means was provided for transferring the cartridge to a location, and still another means was provided for receiving the article from the transfer means and for moving the article into its desired position. Naturally, multiple article handling means of this type were not only extremely complicated and expensive, but additionally, there was always the increased chance that one part would fail, thereby rendering the entire unit inoperative. Moreover, as previously mentioned, although the present unit is admittedly designed for particular use with juke-boxes, it is not in any way to be considered limited to such a use, but instead, it could be used in conjunction with a radio, or could even be used by itself as an individual entertainment unit.

While juke-box equipment of the type described hereinbefore is customarily rendered operative through the introduction of one or more coins of a particular value, those familiar with the art recognize that there are many known types of currency responsive devices which will accept paper money as well as coins, and, of course, the principles of the present invention would remain the same whether the juke-box was initially energized by insertion of a coin or by insertion of a paper bill. As a result, the term "currency" as used in the appended claims, is intended to comprehend both coins and paper money.

After reading the foregoing detailed description, it will be apparent that the objects set forth at the outset of the specification have been successfully achieved. Accordingly,

What is claimed is:

1. In the combination of (a) a currency operated juke-box which includes a power supply and (b) a film selecting and display unit which includes storage means having a plurality of film cartridges therein and a projection means for displaying the film from a selected cartridge, the combination which comprises:

a plurality of selector buttons individually associated with said plurality of film cartridges;

first control means for engaging said selector buttons when said juke-box power supply is energized by insertion of currency of appropriate denomination;

said storage means being movably mounted;

driving means coupled with said storage means to effect movement thereof;

second control means operable responsively to digital depression of a particular selector button to energize said driving motor means and to thereby move said storage means until said selected cartridge associated with said particular selector button reaches a discharge position;

third control means operable when said selected cartridge reaches said discharge position to couple said selected cartridge with said projection means;

said third control means operating feeding means which includes a feeding motor;

said feeding motor being operative responsively to said third control means to linearly move said feeding means and thereby move said selected cartridge out of its initial position in said storage means and into engagement with said projection means;

said projection means including socket means into which at least a portion of said selected cartridge engages upon operation of said feeding means;

fourth control means operable when said selected cartridge is engaged in said socket means to energize said projection means for display of the film in said selected cartridge; and, fifth control means operable when said film in said selected cartridge has been complete displayed to de-energize said projection means;

said feeding motor being operative, after operation of said fifth control means, to cause said feeding means to positively remove said selected cartridge from said socket means and to linearly restore said selected cartridge to its initial position in said storage means.

2. The combination defined in claim 1 wherein said storage means includes a series of outwardly directed pockets disposed about the rotational axis thereof and further includes a base member having an elongated aperture therein through which said feeding means operates.

3. The combination defined in claim 1 wherein said projection means includes a movable mirror and means for moving said mirror into projecting position when said selected cartridge is engaged in said socket means.

4. The combination defined in claim 1 further including switch means operable by the tone control arm of said juke-box, said switch means serving to set said projection means into film advancing operation after said selected cartridge has been engaged in said socket means.

References Cited

UNITED STATES PATENTS

| 2,568,734 | 9/1951 | Heyer | 352—123 |
| 2,625,073 | 1/1953 | Young et al. | 352—123 |

JULIA E. COINER, *Primary Examiner.*